July 5, 1949.  R. E. SHELDON  2,474,870
ACTUATING MECHANISM FOR VELOCIPEDES
Filed Aug. 26, 1946  2 Sheets-Sheet 1
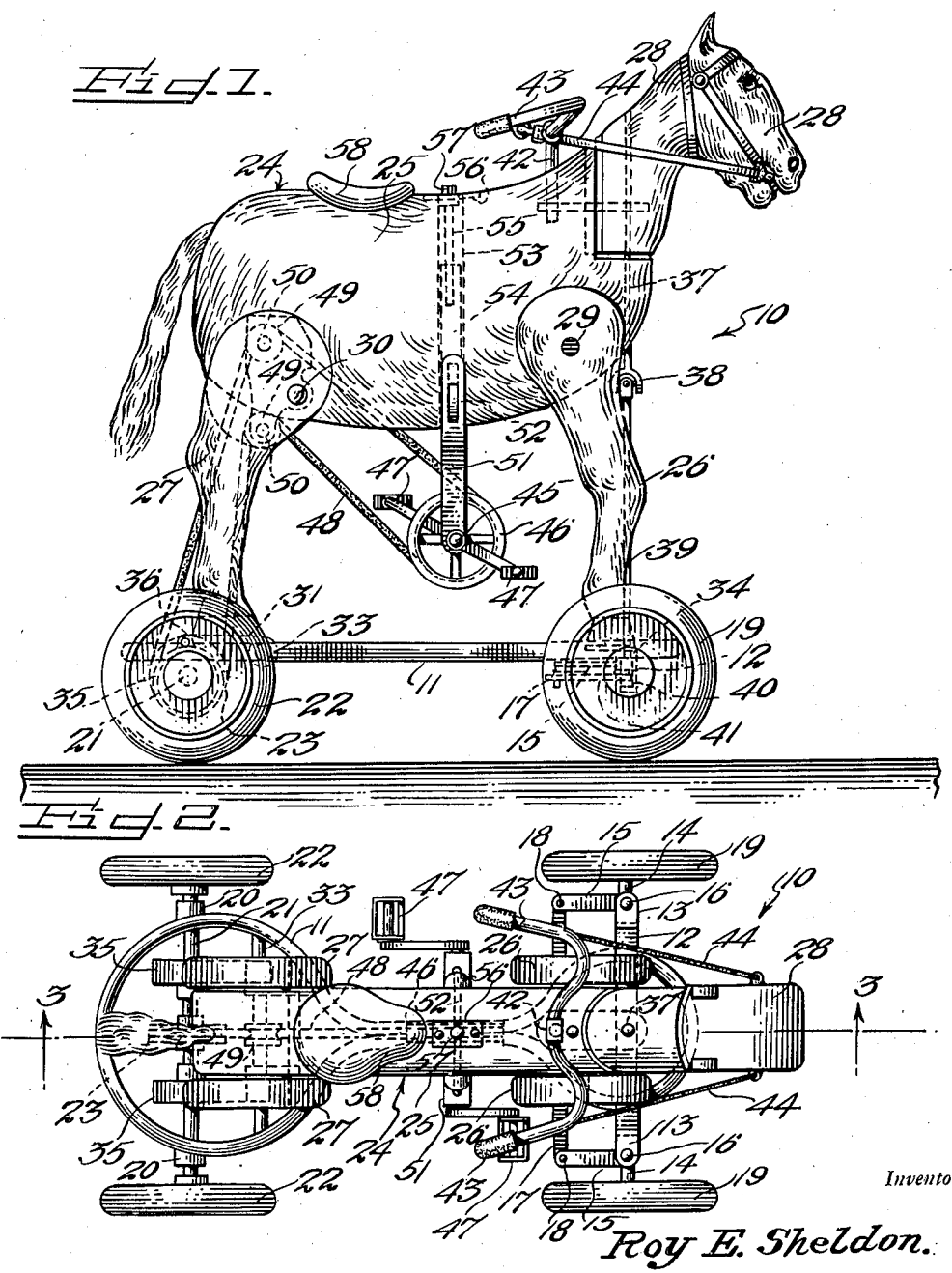
Inventor
Roy E. Sheldon.
By Clarence A. O'Brien
and Harvey B. Jacobson
Attorneys

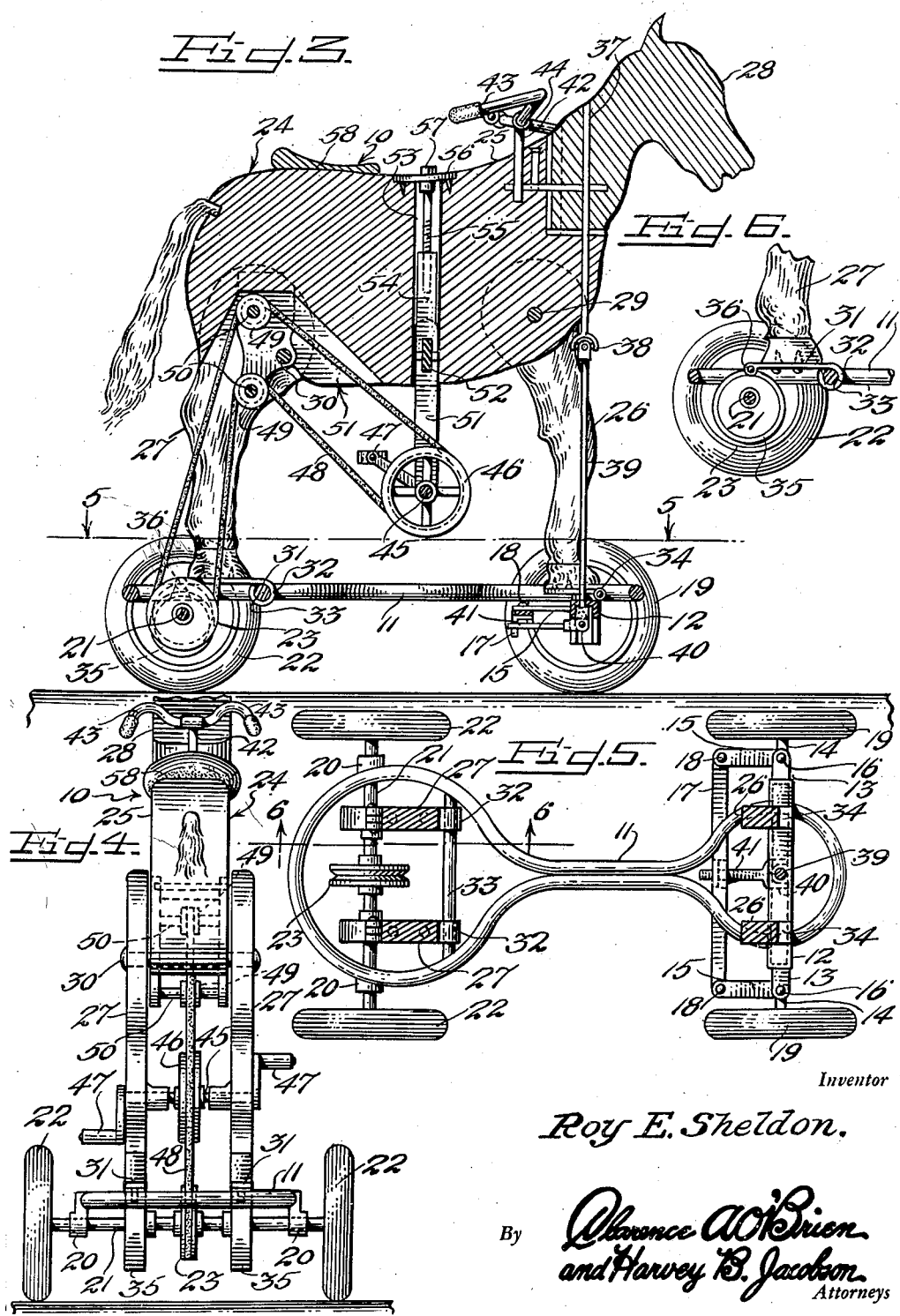

Patented July 5, 1949

2,474,870

UNITED STATES PATENT OFFICE 2,474,870

ACTUATING MECHANISM FOR VELOCIPEDES

Roy E. Sheldon, Portland, Oreg.

Application August 26, 1946, Serial No. 693,151

1 Claim. (Cl. 280—1.20)

This invention relates to new and useful improvements and structural refinements in mechanical animals, more specifically, to improvements in the mechanical horse, United States Patent No. 2,253,096, granted to me on August 19, 1941.

While experimenting with the device constructed in accordance with the above patent, it was found that the same will lend itself to certain improvements and modifications, whereby its construction may be simplified and its utility considerably enhanced.

It is therefore, the principal object of the present invention to provide a device of the character herein described, wherein such improvements and modifications are incorporated. As in the above stated patent, the instant device is mounted upon front and rear pairs of wheels, having drive means for actuating the rear wheels and also, a steering mechanism associated with the front wheels, the steering mechanism being connected to the laterally swingable head of the animal.

A further object of the invention is to provide handle bars on the back of the animal, these being adapted to swing the head and thereby actuate the steering mechanism.

Another object of the invention is to pivotally attach the legs of the animal to its body and to hingedly connect the lower ends of the legs to the wheeled frame on which the animal is positioned, eccentric means being provided on the driven axle and connected to the rear legs of the animal, thereby imparting life-like movement to the animal as a whole, when traveling.

An additional object of the invention is to provide a mechanical animal which is simple in construction and operation, and which may be easily and safely manipulated.

A still further object of the invention is to provide a mechanical animal which will not easily become damaged and which will readily lend itself to economical manufacture.

With the above more important objects in view, and such other objects as may become apparent as this specification proceeds, the invention consists essentially of the arrangement and construction of parts as illustrated in the accompanying drawings, in which:

Figure 1 is a side elevation of the invention;

Figure 2 is a top plan view thereof;

Figure 3 is a cross sectional view, taken substantially in the plane of the line 3—3 in Figure 2;

Figure 4 is a rear end view of the invention;

Figure 5 is a cross sectional view, taken substantially in the plane of the line 5—5 of Figure 3; and Figure 6 is a cross sectional view, taken substantially in the plane of the line 6—6 of Figure 5.

Like characters of reference are used to designate like parts in the specification and throughout the several views.

Referring now to the accompanying drawings in detail, the invention consists of a mechanical animal, namely, a mechanical horse, designated generally by the reference character 10, the same embodying in its construction a frame 11 preferably constructed from steel tubing, and the like, and configurated substantially as shown.

A front axle 12 is secured to the forward end portion of the frame 11, this axle being non-rotatable and assuming the form of an inverted U-shaped channel provided in the ends thereof with knuckle supports 13. Steering knuckles consisting of the stub shafts 14 and the tie rod arms 15 are hingedly connected to supports 13 by means of the king pins 16 and the arms 15 are connected by a tie rod 17 which is pivotally attached thereto as at 18.

The stub shafts 14 carry a pair of wheels 19 and it will be noted that in the foregoing manner, an efficient steering mechanism for these wheels is provided. The means for actuating this mechanism will be hereinafter more fully explained.

A pair of suitable bearing boxes 20 are secured to the rear end portion of the frame 11 and a rear axle 21 is rotatably journalled in these bearings. This axle carries a pair of rear wheels 22 and is driven by means of a pulley 23 secured to the axle medially the length of the latter.

A body designated generally by the reference character 24 is positioned on the frame 11, said body simulating the appearance of a horse. It should, of course, be understood that any other four legged animal may be represented with substantially equal effectiveness.

The animal 24 includes the body portion 25 provided with front and rear pairs of legs 26, 27 respectively, and with a laterally swingable head 28. The legs 26, 27 are pivotally connected at the upper ends thereof to the body portion 25 as at 29 and 30 respectively. These pivotal connections simply assume the form of suitable pins extending transversely through the body portion, as will be clearly apparent from the accompanying drawings. The lower extremities of the legs are hingedly connected, so to speak, to the frame 11, this being accomplished by securing the rear legs to a pair of plates 31 each of which is formed at one end with an eye 32. The eyes 32 of the two plates pivotally engage a transversely extending shaft 33 provided in the frame 11. The front legs 26 are secured to a pair of hinges 34, these in turn, being mounted upon the afore-mentioned front axle 12, as is best shown in Figure 3.

A pair of eccentrics 35 are secured to the rear axle 21, the throw of these eccentrics being synchronized and each eccentric consisting of an inner disc rotatable in a peripheral shell which is pivotally connected as at 36 to one of the plates 31 supporting the associated leg 27.

The afore-mentioned head 28 is laterally swingable as afore-said, and is secured to the upper end portion of a shaft-like steering column 37. This column is rotatably journalled in the breast portion of the body 25 and is universally connected as at 38 to the column extension 39. The lower end of the latter is rotatably journalled in the front axle 12 and carries a swivel coupling 40, which in turn, is provided with a rearwardly extending steering arm 41. This arm engages the afore-mentioned tie rod 17 and it will be noted that the swinging of the head 28 in one direction or the other will produce a corresponding deflection of the wheels 19.

An upright steering post 42 is rotatably mounted in the back, so to speak, of the body 25 and carries a pair of handle bars 43, configurated substantially as shown. A pair of reins 44 are connected at one end to these handle bars, the remaining ends of the reins being attached to the relatively opposite sides of the head 28, as will be readily understood. It will be noted that manipulation of the handle bars 43 will swing the head 28 from one side to the other and cause a corresponding deflection of the wheels 19.

Means for driving the rear wheels 22 includes a transversely extending drive shaft 45 rotatably mounted at the underside of the body 25, the shaft 45 carrying medially of its length a drive pulley 46 and also being provided at the ends thereof with a pair of crank-like foot pedals 47. An endless cable or belt 48 operatively connects the pulley 46 with the afore-mentioned pulley 23 on the rear axle 21, the belt 48 passing over a pair of guide pulleys 49.

These pulleys are rotatably positioned on the shafts 50 which extend transversely of the body 25 and are secured in the side walls of a suitable recess 51 with which the underside of the body is provided. It will be noted that the pulleys 49 are disposed substantially in vertical alignment and that they are positioned in the vicinity of the pivot 30 whereby the legs 27 are connected to the body 25.

The afore-mentioned drive shaft 45 is rotatably mounted at the lower end of a carrier 51, this assuming the form of a pair of side bars positioned at the sides of the body 25 and connected together by a transversely extending cross member 52. This cross member is vertically slidable in a suitable pair of slots provided in the sides of the body 25 and the body is also formed with an upright bore 53 forming a guide, so to speak, for a slidable plunger 54. This plunger is secured to the afore-mentioned cross member 52 and the upper end of the plunger is formed with a threaded bore to receive a screw threaded shaft 55. This shaft is rotatably mounted adjacent the upper end thereof in a plate 56 secured to the body 25 and the upper extremity of the shaft carries an adjusting head 57.

Matters are so arranged that by applying a wrench, or the like, to the head 57 and rotating the shaft 55, the plunger 54 and the associated carrier 51 will be slid vertically with respect to the body 25, whereby the tension of the cable 48 may be adjusted as required.

It should be stated at this point that the cable 48 and the pulleys 46, 49 and 23 may be effectively substituted by sprocket wheels and chain.

When the invention is placed in use, the rider may mount a suitable seat 58 provided on the body 25 and by actuating the foot pedals 47, the device will be propelled, either forwardly or backwardly, along the ground. Steering is effected by simply manipulating the handle bars 43, thereby deflecting the wheels 19 and simultaneously swinging the head 28 in the appropriate direction, as afore-said.

During the propulsion of the invention along the ground, the eccentrics 35 associated with the legs 27 will impart life-like galloping motion to the horse which is further enhanced by the pivotal connection of the legs 26, 27 to the body 25 and by the hinged connection of the front legs to the axle 12. It should be understood in this connection, that the positional relationship of the guide pulleys 29 with respect to the pivot 30 of the legs 27 is such that the varying relative position of the pulleys 23 and 46, incident to the movement of the animal 24, will not affect the tension of the cable 48. In other words, the cable will provide an effective operating connection between the pulleys regardless of the animal's movement and the cable tensioning adjustment provided by the shaft 55 is used only during the initial installation of the cable and for subsequent periodic adjustments to compensate for inherent stretching of the same.

It is believed that the advantages and use of the invention will be clearly understood from the foregoing disclosure and accordingly, further description thereof at this point is considered unnecessary.

While in the foregoing there has been shown and described the preferred embodiment of this invention it is to be understood that minor changes in the details of construction, combination and arrangement of parts may be resorted to without departing from the spirit and scope of the invention as claimed.

What I claim as my invention is:

In a velocipede, a frame including an axle and a pair of travelling wheels thereon, a body simulating the appearance of an animal positioned on said frame, said body having front and rear pairs of legs pivotally attached thereto, hinges connecting said front legs to said frame, a pair of eccentrics on said axle, a pair of foot plates pivoted to said frame and pivotally connected to said eccentrics, said rear legs being secured to said foot plates, a transversely extending drive shaft on the underside of said body between the front and rear pairs of legs, foot pedals and a drive pulley on said shaft, a driven pulley on said axle, a pair of guide pulleys in said body adjacent the upper ends of the rear legs, and an endless cable passing over said pulleys.

ROY E. SHELDON.

REFERENCES CITED

The following references are of record in the file of this patent:

UNITED STATES PATENTS

| Number | Name | Date |
|---|---|---|
| 526,210 | Young | Sept. 18, 1894 |
| 1,100,411 | Wagner et al. | June 16, 1914 |
| 1,270,638 | Majewski | June 25, 1918 |
| 1,385,320 | Frick | July 19, 1921 |
| 1,393,512 | Dunning | Oct. 11, 1921 |
| 1,570,546 | Appleby | Jan. 19, 1926 |
| 1,823,138 | Gillenwater | Sept. 15, 1931 |
| 2,211,151 | Naegle | Aug. 13, 1940 |

FOREIGN PATENTS

| Number | Country | Date |
|---|---|---|
| 255,765 | Great Britain | July 29, 1926 |
| 320,474 | Great Britain | Oct. 17, 1929 |